UNITED STATES PATENT OFFICE.

PASQUALE ALFIERI, NAPLES, ITALY.

INCRUSTATION-PREVENTIVE.

SPECIFICATION forming part of Letters Patent No. 239,417, dated March 29, 1881.

Application filed November 9, 1880. (Specimens.) Patented in France September 15, 1880.

*To all whom it may concern:*

Be it known that I, Commander PASQUALE ALFIERI, a citizen of the Kingdom of Italy, residing at Naples, in the said Kingdon, have invented a new and useful Composition of Matter for Preventing and Removing Incrustations in Steam or other Boilers, of which the following is a specification.

This invention relates to a composition of matter for preventing and removing incrustations in boilers, consisting of the substances hereinafter specified, and mixed together in substantially the proportions set forth.

The compound forming the subject of my invention, and which is intended to remove the incrustations in steam and other boilers, as also to prevent the formation of the same, is composed of the carbonate of baryta, nitrate of ammonia, chloride of sodium, and vegetable charcoal. The proportions in which these substances are preferably to be mixed I have found to be as follows—namely:

| | |
|---|---|
| Carbonate of baryta | 250 grams. |
| Nitrate of ammonia | 325 " |
| Chloride of sodium | 225 " |
| Vegetable charcoal | 200 " |
| Total | 1,000 grams. |

These ingredients are reduced to powder in order to be thoroughly mixed. When thus mixed they are placed in the boiler, where they are dissolved by the water, and thus produce the desired results.

By the combined action of carbonate of baryta, nitrate of ammonia, and chloride of sodium, the incrustations in steam boilers which have already formed, and which consist chiefly of sulphate of lime and carbonate of lime, are decomposed and brought in such a condition that they can be blown out with the water.

When my compound is mixed with the feed-water it prevents the formation of incrustations.

Of course I do not limit myself to the exact proportions above set forth; but I have found that the mixture thus constituted secures the desired result in a satisfactory manner.

What I claim as new, and desire to secure by Letters Patent, is—

The herein-described compound for preventing and removing incrustations in boilers, consisting of carbonate of baryta, nitrate of ammonia, chloride of sodium, and vegetable charcoal, mixed together substantially in the proportions specified.

In testimony whereof I have hereunto set my hand and seal in the presence of two subscribing witnesses.

DR. PASQUALE ALFIERI. [L. S.]

Witnesses:
EZRI BARBATELLI,
RAFFAELE LAURARA.